(12) United States Patent
Deprouw

(10) Patent No.: US 11,319,986 B2
(45) Date of Patent: May 3, 2022

(54) SYSTEM AND A METHOD FOR DETECTING WEAR OF A BALL-JOINT CONNECTION DEVICE OF A ROD, A ROTOR ASSEMBLY, AND AN AIRCRAFT

(71) Applicant: AIRBUS HELICOPTERS, Marignane (FR)

(72) Inventor: Florent Deprouw, Aix en Provence (FR)

(73) Assignee: AIRBUS HELICOPTERS, Marignane (FR)

(*) Notice: Subject to any disclaimer, the term of this patent is extended or adjusted under 35 U.S.C. 154(b) by 109 days.

(21) Appl. No.: 16/788,432

(22) Filed: Feb. 12, 2020

(65) Prior Publication Data

US 2020/0256377 A1 Aug. 13, 2020

(30) Foreign Application Priority Data

Feb. 12, 2019 (FR) ........................................ 1901377

(51) Int. Cl.
*F16C 11/06* (2006.01)
*B64F 5/60* (2017.01)
(Continued)

(52) U.S. Cl.
CPC ........ *F16C 11/0647* (2013.01); *B64C 27/006* (2013.01); *B64F 5/60* (2017.01); *B64D 2045/0085* (2013.01)

(58) Field of Classification Search
CPC .... F03D 17/00; F16C 11/0647; B64C 27/001; B64C 27/006; B64F 5/60; B64D 2045/0085
(Continued)

(56) References Cited

U.S. PATENT DOCUMENTS 8,457,836 B2 * 6/2013 Balasu ................. B60T 17/221
701/31.4
9,240,083 B2 * 1/2016 Isom ................... G07C 5/0816
(Continued)

FOREIGN PATENT DOCUMENTS

DE 100 59 917 A1 6/2002
FR 2599793 A1 12/1987
(Continued)

OTHER PUBLICATIONS

European Search Report and Written Opinion dated Jul. 15, 2020 (with English Machine Translation), Application No. 20156283.2-1010, Applicant Airbus Helicopters, 22 Pages.
(Continued)

*Primary Examiner* — Octavia Hollington
(74) *Attorney, Agent, or Firm* — Brooks Kushman P.C.

(57) ABSTRACT

The present invention relates to a detection system for detecting wear of a ball-joint connection device of a pitch rod. The detection system includes at least one measurement assembly, said at least one measurement assembly having at least one deformation gauge for placing on said pitch rod, said detection system comprising at least one electrical conditioning circuit connected to at least one said deformation gauge and to at least one electrical energy source, said electrical conditioning circuit being configured to generate a measurement signal that varies as a function of deformation of said at least one deformation gauge and as a function of said wear.

19 Claims, 7 Drawing Sheets

(51) Int. Cl.
*B64C 27/00* (2006.01)
*B64D 45/00* (2006.01)

(58) Field of Classification Search
USPC .......................................................... 73/862
See application file for complete search history.

(56) References Cited

U.S. PATENT DOCUMENTS

| | | | |
|---|---|---|---|
| 9,284,849 B2 * | 3/2016 | Perrin | B64C 27/008 |
| 9,329,093 B2 * | 5/2016 | Chana | G01L 3/108 |
| 9,459,168 B2 * | 10/2016 | Kohuth | B64C 9/20 |
| 9,879,973 B2 * | 1/2018 | Boisson | G01B 11/18 |
| 2008/0036617 A1 | 2/2008 | Arms et al. | |

FOREIGN PATENT DOCUMENTS

| | | |
|---|---|---|
| WO | 2013/021216 A1 | 2/2013 |
| WO | 2014153518 A1 | 9/2014 |
| WO | 2018152277 A1 | 8/2018 |

OTHER PUBLICATIONS

French Search Report for French Application No. FR 1901377, Completed by the French Patent Office, dated Nov. 14, 2019, 9 pages.

* cited by examiner

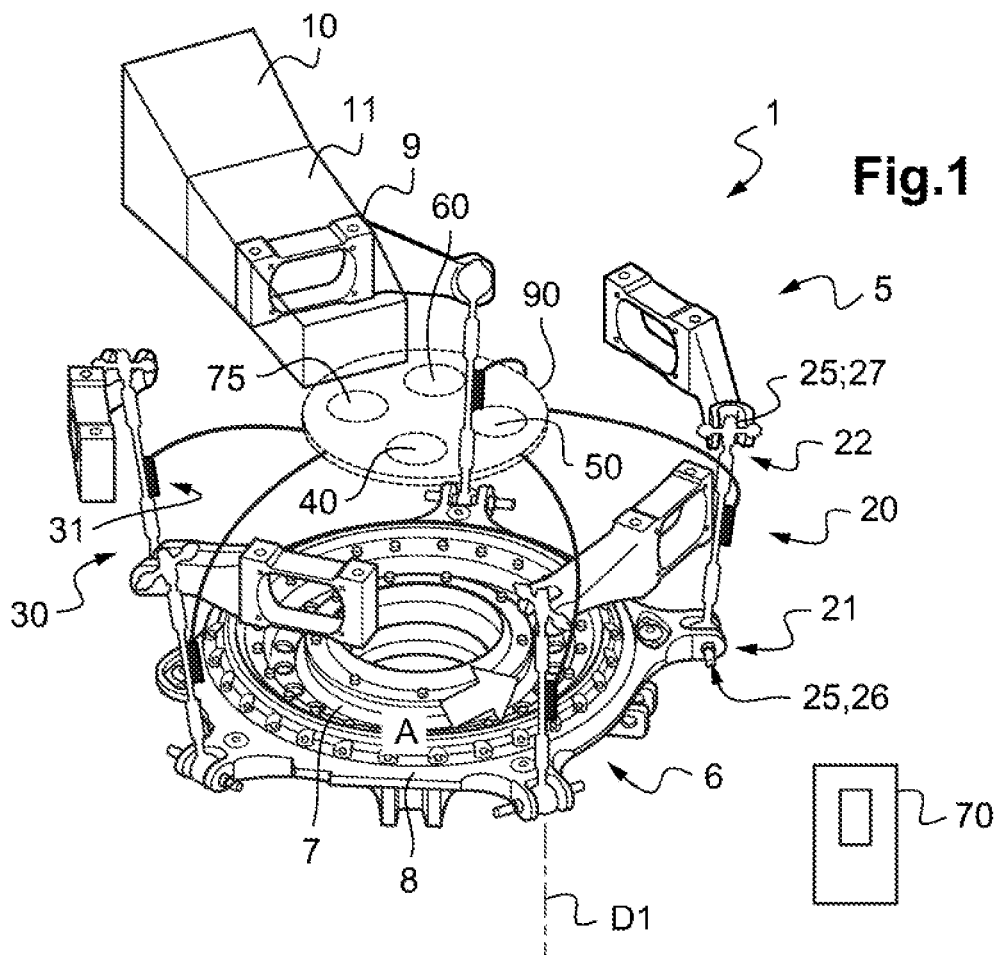
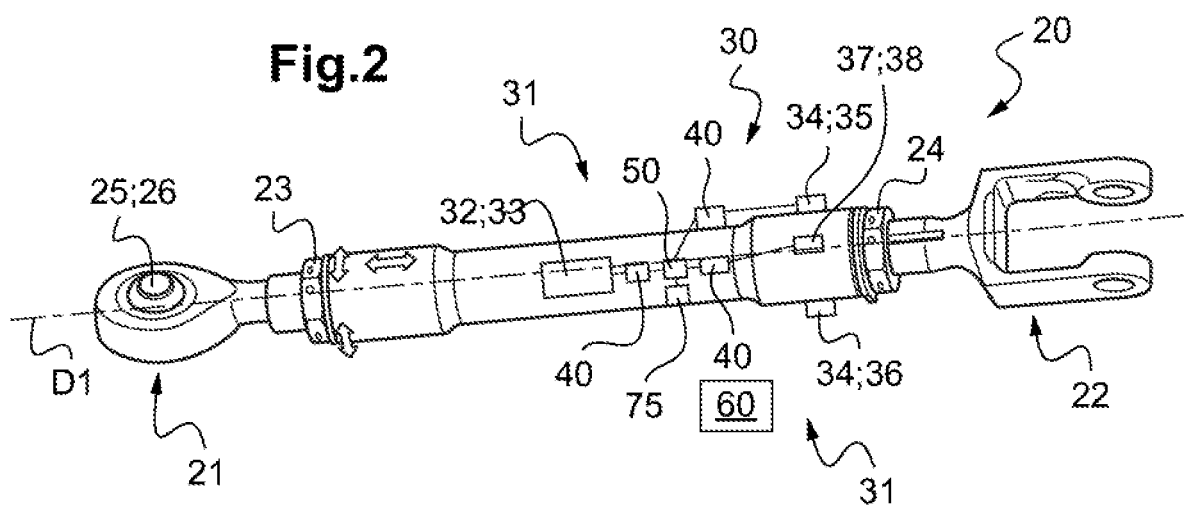

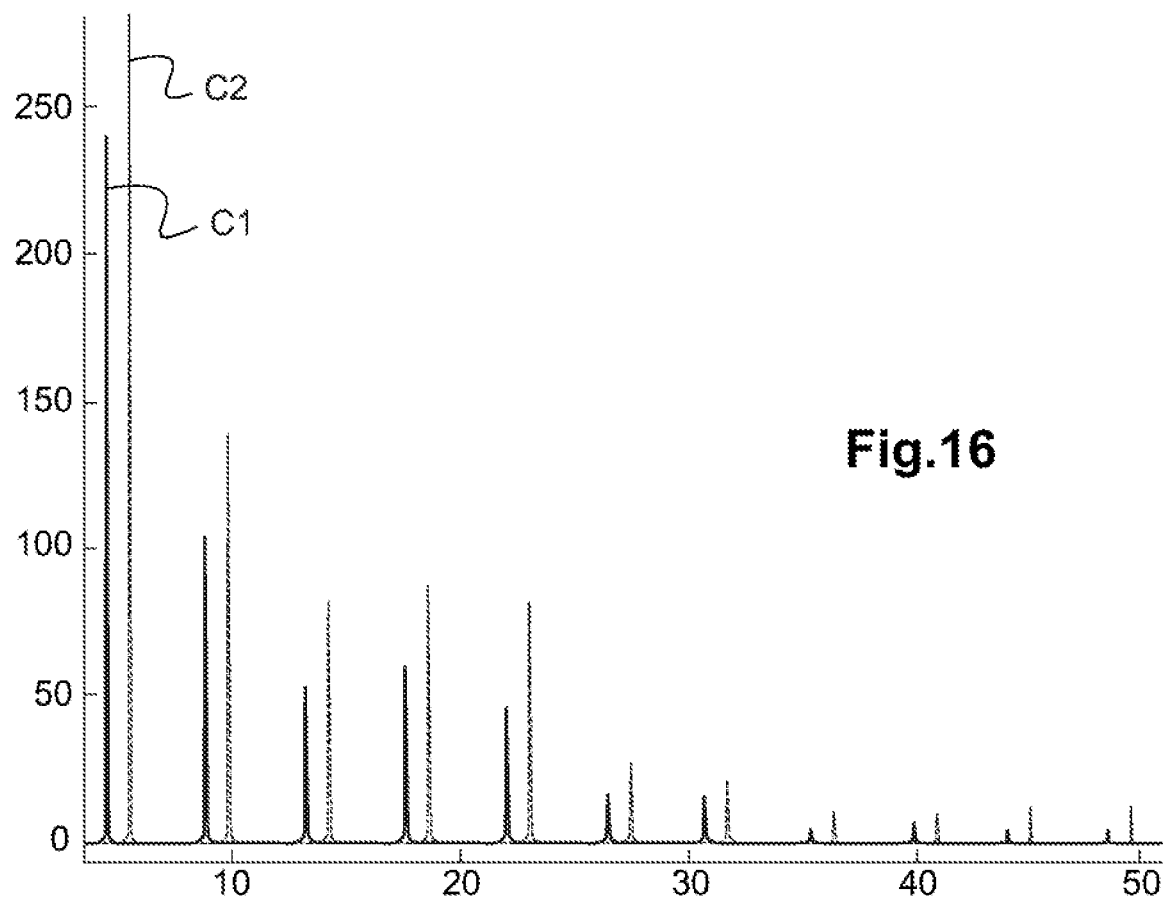

ent invention relates to a system and to a method
SYSTEM AND A METHOD FOR DETECTING WEAR OF A BALL-JOINT CONNECTION DEVICE OF A ROD, A ROTOR ASSEMBLY, AND AN AIRCRAFT

CROSS REFERENCE TO RELATED APPLICATIONS

This application claims the benefit of FR 19 01377 filed on Feb. 12, 2019, the disclosure of which is incorporated in its entirety by reference herein.

FIELD OF THE INVENTION

The present invention relates to a system and to a method for detecting wear of a ball-joint connection device of a connecting rod, to a rotor assembly, and to an aircraft provided with such system.

BACKGROUND OF THE INVENTION

In order to make a ball-joint connection between two mechanical parts, an operator can make use of a ball-joint connection device. Such a device is sometimes referred to more simply as a "ball-joint".

A ball-joint connection device may comprise an outer cage and a ball. The ball is then inserted in the outer cage in order to be rotatably movable relative to the outer cage. Anti-fiction means may be interposed between the spherical ball and the outer cage. The anti-fiction means may be fastened to the inner wall of the outer cage so as to face the spherical ball, or conversely they may be fastened to the outer wall of the spherical ball so as to face the outer cage. Such anti-fiction means may be referred to as a "liner".

The ball itself is sometimes referred to as a "ball-joint" or indeed as an "inner ring", for example. The ball is sometimes also referred to as a "spherical ball". Nevertheless, such terminology can appear inappropriate insofar as the ball sometimes includes at least one flat or even two flats at two diametrically opposite ends. Thus, the ball is in fact a sphere that is truncated at at least one pole. A ball may also be secured to a rod or it may have a rod passing through it. The term "ball" is used below.

Under such conditions, the outer cage may be fastened by conventional means to a first mechanical part. Likewise, the ball may be fastened to a second mechanical part, e.g. by using a fastener rod passing right through the ball via its truncated poles.

Such ball-joint connection devices are in widespread use. In particular, a rotor of an aircraft, e.g. such as a main rotor of a helicopter, may include pitch rods for controlling the pitch of its blades. By way of example, a pitch rod is hinged firstly to a rotary swashplate of a set of swashplates by means of a first ball-joint device, and secondly to a pitch lever by means of a second ball-joint device. The outer cage of each ball-joint device is then secured to a member of the rod, the ball of the first ball-joint device being secured to the rotary swashplate of the set of swashplates, and the ball of the second ball-joint device being secured to the pitch lever.

Ball-joint devices are effective. Nevertheless, the anti-fiction means, and/or the ball, and/or the outer cage naturally erode during the lifetime of the ball-joint connection device. The resulting wear leads to unwanted clearance being created between the ball and the outer cage. On an aircraft rotor pitch rod, such play has a harmful impact on the control of the aircraft. Consequently, this wear ends up with the ball-joint connection device being replaced as a function of a removal criterion determined by the manufacturer. The removal criterion may consist in a maximum amount of clearance that is acceptable between the outer cage and the ball.

Nevertheless, such clearance is difficult to measure and measurement may need to be performed following a procedure that can be lengthy and relatively expensive. For example, the procedure may require each pitch rod to be dismantled by performing the following actions: an operator getting up to the level of the rotor by using a ladder or a platform, opening a protective cover, preparing the rotor, e.g. by setting a blade pitch and/or by preventing the rotor from rotating, dismantling the rods, verifying the clearance of each rod, reassembling the rods, releasing the rotor, closing the protective cover, and the operator getting back down.

In addition to the relatively long duration of that procedure, an operator needs to make use of various tools in order to perform that maintenance action, which can make it more complicated to carry out. Also, that procedure implies that the clearance is evaluated by a human being, which evaluation might therefore be erroneous.

Documents US 2008/036617, FR 2 599 793, WO 2014/153518, and WO 2018/152277 are also known.

SUMMARY OF THE INVENTION

An object of the present invention is thus to provide a system that facilitates detecting a ball-joint connection device that is worn to a degree that requires the ball-joint connection device to be removed.

The invention provides a detection system for detecting wear of a ball-joint connection device of a pitch rod of a rotor assembly.

The detection system includes at least one measurement assembly, the at least one measurement assembly having at least one deformation gauge for placing on a pitch rod that is to be monitored, the detection system comprising at least one electrical conditioning circuit connected to at least one said deformation gauge and to at least one electrical energy source, the electrical conditioning circuit being configured to generate a measurement signal that varies as a function of deformation of said at least one deformation gauge and as a function of said wear.

The system may include one or more electrical conditioning circuits for each measurement assembly, possibly arranged on one or more electronics cards. Likewise, the system may comprise one or more electrical energy sources for each measurement assembly, it being possible for a single electrical energy source to power one or more electrical conditioning circuits. For example, each measurement assembly may comprise a plurality of subassemblies, each provided with at least one deformation gauge, the system comprising an electrical conditioning circuit for each subassembly and an electrical energy source for each electrical conditioning circuit.

Furthermore, and by way of example, the electrical conditioning circuit may comprise a conventional Wheatstone bridge circuit. The electrical conditioning circuit includes a member that generates the measurement signal, e.g. such as a member measuring a difference of electric potential or of electric current, or indeed a capacitance. An electrical conditioning circuit may include an output for transmitting the measurement signal to another member for processing and/or may include a memory for storing each measurement signal in order to be able to use it subsequently. An energy source may comprise at least one optionally-rechargeable battery, at least one electrical energy harvesting system . . . .

Such a detection system can serve to evaluate the presence of unacceptable clearance in a ball-joint connection device of a rod, and in particular of a pitch rod of an aircraft rotor, and for example clearance that is small and greater than or equal to 0.25 millimeters (mm).

In operation, the commands applied by a human pilot or by an autopilot together with the movements of the blade connected to the pitch rod either directly or via a cuff, for example, and the vibration of the rotor all generate forces exerted on the pitch rod. Those forces deform the pitch rod. However, a pitch rod deforms differently in the presence of unacceptable clearance in one of its ball-joint connection devices. Surprisingly, predetermined indicators applied to the raw or processed measurement signal can enable such clearance to be identified.

Under such circumstances, the detection system is provided with at least one deformation gauge, e.g. an axial traction or bending strain gauge, arranged on a pitch rod in order to act in conventional manner to measure deformation of the pitch rod in real time. The measurement signal generated by the electrical conditioning circuit from the deformation of the deformation gauge, which is an image of the deformation of the pitch rod, is then used to identify the presence of clearance to a degree that requires a maintenance action. The measurement signal may be used to obtain one or more indicators in the time domain or in the frequency domain, and to determine whether maintenance action needs to be undertaken by studying these indicators. The measurement signal may be used in real time, or subsequently. The measurement signal may be used on board the aircraft or externally therefrom.

Specifically, for a given pitch rod, the measurement signal varies as a function of the wear of the ball-joint connection device, with this variation being detectable in the presence of unacceptable clearance by performing particular analysis in the time domain and/or in the frequency domain.

Consequently, the present invention proposes monitoring the wear of a ball-joint connection device by using at least one deformation gauge carried by a pitch rod and by analyzing the measurement signal, e.g. by comparing it with a stored threshold that has been determined by testing. This procedure therefore does not require a pitch rod to be dismantled in order to be tested.

Furthermore, the detection system can provide safety insofar as excessive wear is detected automatically at least in part by the detection system, thereby making it possible to reduce the risk of a worn pitch rod being left in place as a result of human error in assessing wear.

Under such circumstances, the detection system may be arranged at least in part on a rotor in order to detect when clearance in a ball-joint connection of a pitch rod becomes excessive without any need for dismantling, nor even any need to require an operator to get up on the rotor. The detection system acts in innovative manner to detect unusual deformation of the pitch rod during a flight and to report on the state of the ball-joint connections.

The detection system may also include one or more of the following characteristics.

In one aspect, the detection system may comprise monitoring calculation means in communication with said at least one electrical conditioning circuit, the monitoring calculation means being configured to process said measurement signal and to determine the presence of said wear to a degree that requires maintenance action on said pitch rod when said measurement signal as processed by the monitoring calculation means presents a predetermined anomaly.

Such an anomaly may be in the form of a time-varying measurement signal exceeding a stored threshold, or in the form of a frequency component of a signal in the frequency domain having an amplitude that is greater than or less than a stored threshold. Such a frequency component of a signal in the frequency domain may be in the form of a line in a spectral plot.

A single measurement assembly may have its own dedicated monitoring calculation means, or the monitoring calculation means may be shared among a plurality of measurement assemblies.

Each measurement assembly of the detection system may include one or more monitoring calculation means, possibly arranged on one or more electronics cards. For example, each measurement assembly may comprise a plurality of subassemblies, each provided with at least one deformation gauge, the detection system comprising an electrical conditioning circuit for each subassembly and indeed an electrical energy source for each electrical conditioning circuit. Alternatively, single monitoring calculation means may be dedicated to a plurality of subassemblies.

Furthermore, the monitoring calculation means may be arranged in a rotary reference frame of an aircraft by being carried by a pitch rod or by a rotary member of a rotor assembly. The monitoring calculation means may also be offset in a non-rotary reference frame, being connected by wired or wireless connections to at least one electrical conditioning circuit. Alternatively, or in addition, the monitoring calculation means may be offset away from the aircraft, being configured to be connected by wired or wireless connections to at least one electrical conditioning circuit.

Independently of the way in which the monitoring calculation means are arranged, the monitoring calculation means communicate with at least one electrical conditioning circuit in order at least to recover one or more measurement signals so as to determine the presence of a predetermined anomaly in order to estimate whether a ball-joint connection device presents unacceptable clearance. The monitoring calculation means may include a memory storing at least one measurement signal prior to processing and/or at least one measurement signal after processing and/or information indicating whether a ball-joint connection is worn, such as for example a determined value for the clearance or a Boolean value representative of a healthy or worn state. For example, while on the ground, a ground maintenance operator may recover one or more measurement signals stored in at least one monitoring calculation means via a wireless connection with such monitoring calculation means, and then process that signal. In another example, while on the ground, a ground maintenance operator may recover information stored in on-board monitoring calculation means and indicating directly whether a ball-joint connection device is worn.

In one aspect, the detection system may include warning means in communication with said monitoring calculation means, the monitoring calculation means being configured to control the warning means in order to signal the presence of wear when said measurement signal as processed presents said predetermined anomaly.

Optionally, monitoring calculation means may process each measurement signal by applying a robust algorithm in order to estimate whether the ball-joint connection device presents wear to a degree that requires a maintenance action. If so, the calculation means may operate warning means to indicate in tactile, visual, or audible manner that the pitch rod needs to be subjected to a maintenance action, e.g. within a predetermined time period. Such warning means may be in the form of a tactile, visual, audible, . . . system. By way of example, a housing may contain monitoring calculation means together with a light-emitting diode (LED) of the warning means, with the monitoring calculation means switching on the LED if unacceptable clearance is detected while processing a measurement signal.

In one aspect, said detection system may include at least a first antenna for transmitting away from the rotor assembly either the measurement signal or else a signal emitted by the monitoring calculation means connected to an electrical conditioning circuit, said first antenna being connected to the electrical conditioning circuit or to the monitoring calculation means.

Optionally, the monitoring calculation means may be shared between a plurality of measurement assemblies and may be connected to a first antenna.

Optionally, an electrical conditioning circuit may be connected to a first antenna that communicates with a second antenna of the monitoring calculation means.

In one possibility, each measurement assembly may be fastened directly to the pitch rod that is to be monitored. Likewise, an electrical conditioning circuit and/or an electrical energy source and/or optionally monitoring calculation means and/or a first antenna may be fastened directly to the pitch rod in order to avoid wiring constraints in a rotary reference frame. In one possibility, each pitch rod may present its own detection system.

Under such circumstances, the detection system may include attachment means for fastening at least one measurement assembly directly on a pitch rod. Likewise, attachment means may be used for fastening an electrical conditioning circuit, and/or an electrical energy source, and/or optionally monitoring calculation means, and/or a first antenna directly on a pitch rod.

For example, the attachment means may comprise adhesive or the equivalent, welding, a screw fastener system, an attachment collar, these examples being given by way of example.

In one aspect, said detection system may include a carrier, said carrier being provided with a fastener device for fastening to the pitch rod that is to be monitored, said carrier including an elastically deformable measurement segment carrying a said measurement assembly.

The term "faster device for fastening to the pitch rod that is to be monitored" covers one or more elements contributing to holding the carrier on a pitch rod, e.g. to members suitable for clamping between two nuts of the pitch rod.

This variant can avoid any need to modify a pitch rod physically in order to install a measurement assembly thereon. A carrier may be arranged on a pitch rod in a manner that is reversible and nondestructive. At least one deformation gauge may be fastened to the carrier, with the carrier constituting a housing carried by the pitch rod, for example. By way of example, each pitch rod of a rotor assembly may be fitted with such a carrier.

Optionally, the carrier and the members carried by the carrier may form a piece of equipment that presents a center of gravity that is positioned substantially on a central axis of the carrier, the central axis coinciding with the longitudinal extension direction of a pitch rod when the carrier is carried by the pitch rod. Thus, the carrier is balanced so as to avoid giving rise to additional stresses in the pitch rod in order to avoid degrading the measurements and in order to avoid the piece of equipment turning about the pitch rod. This variant can potentially avoid giving rise to new modes of wear, e.g. by not causing a rod to turn about its own longitudinal axis.

In one aspect, the measurement segment may include at least one said energy source and/or at least one said electrical conditioning circuit. For example, at least one energy source and/or at least one electrical conditioning circuit may be embedded in the measurement segment or may be fastened to a wall of the measurement segment.

In one aspect, the carrier may present a first segment including at least one said electrical energy source, said carrier presenting a second segment including at least one electrical conditioning circuit.

The first and second segments may be distinct, or they may coincide.

Optionally, the carrier may also carry other members of the detection system in order to form a piece of equipment that is complete and removable for fastening to a pitch rod.

The carrier may carry a plurality of electrical energy sources that are circumferentially equidistant around the central axis, and/or a plurality of electrical conditioning circuits that are circumferentially equidistant around the central axis.

In one aspect, the measurement segment may surround a hollow space configured to have said pitch rod passing therethrough without being in contact with the pitch rod, said measurement segment being arranged longitudinally between two rigid segments for fastening to the pitch rod.

In particular, each deformation gauge of a pitch rod may be carried by a deformable measurement segment that, surprisingly, is not itself in contact with the pitch rod.

In one possibility, the measurement segment has a cylindrical inside face of diameter that is greater than the outside diameter of an outside face of the pitch rod, with radial clearance lying between the outside face and the inside face.

Optionally, the two rigid segments comprise respectively the above-mentioned first segment and second segment.

In one aspect, the detection system may comprise a plurality of measurement assemblies, each measurement assembly being connected to a concentrator by a wired or wireless connection, said concentrator comprising at least said electrical conditioning circuit.

In one aspect, the detection system may comprise a plurality of measurement assemblies arranged on respective pitch rods, together with one concentrator. The concentrator may comprise at least one energy source and/or at least one monitoring calculation means and/or at least one antenna and/or at least one electrical conditioning circuit. Such a concentrator serves to centralize the functions of storing electrical energy and/or of wireless transmission and/or of processing. Furthermore, this arrangement makes it possible to lighten each piece of equipment that is arranged on a pitch rod, thereby reducing the stresses that result from this arrangement.

In one aspect, said at least one measurement assembly may include at least one traction deformation gauge extending along an axial direction, the axial direction being suitable for being parallel to the extension direction of a pitch rod, for example.

Thus, a subassembly of a measurement assembly may comprise a traction deformation gauge, e.g. a strain gauge.

In one aspect, said at least one measurement assembly includes at least two first bending deformation gauges arranged around a direction that, for example, is suitable for coinciding with the extension direction of a pitch rod.

Thus, a subassembly of a measurement assembly may comprise at least two first bending deformation gauges, e.g. of strain gauge type, and in particular a pair of first bending deformation gauges.

Optionally, another subassembly may comprise at least two second bending deformation gauges, and in particular a pair of second bending deformation gauges.

In an embodiment that is robust from a measurement point of view, said at least one measurement assembly may include at least five said deformation gauges comprising a traction deformation gauge together with at least two first bending deformation gauges arranged around an axis and at least two second bending deformation gauges arranged around the same axis, said two first bending deformation gauges and said two second bending deformation gauges being offset in azimuth around the axis.

These three subassemblies serve respectively to perform respective different kinds of processing, and thus to optimize detecting wear.

The invention also provides a rotor assembly provided with a plurality of blades and of pitch rods. Each pitch rod extends longitudinally from a first zone to a second zone, at least one of said first and second zones comprising a ball-joint connection device. Each pitch rod may be moved in order to modify the pitch of at least one blade, either directly or else via other mechanical members.

For example, the rotor assembly may comprise a rotary swashplate mechanically connected to each blade at least via a respective pitch rod. Optionally, the first zone of a pitch rod is provided with a first ball-joint connection device connected to the swashplate, and the second zone is provided with a second ball-joint connection device connected to a pitch lever.

The rotor assembly includes at least one detection system of the invention.

Each pitch lever may be hinged to a blade or to a blade cuff.

The invention also provides an aircraft provided with such a rotor assembly.

The invention also provides a detection method for detecting wear of a ball-joint connection device of a pitch rod of a rotor assembly of such an aircraft.

When at least one deformation gauge is a traction deformation gauge arranged to measure deformation along the extension direction of the pitch rod, the method may comprise the following steps:
  establishing a time-varying traction measurement signal by measuring deformation of the pitch rod with the traction deformation gauge;
  evaluating a current stage of flight of the aircraft; and
  while the aircraft is flying in a level stage of flight, detecting wear to a degree that requires replacement of the ball-joint connection device when the time-varying traction measurement signal presents an erroneous amplitude; and
  while the aircraft is in an approach stage of flight, establishing a processed measurement signal that has been processed at least by performing a Fourier transform on the time-varying traction measurement signal and detecting a degree of wear that requires replacement of the ball-joint connection device when the processed signal presents, at a predetermined frequency or in a predetermined range of frequencies, at least one frequency component that has an amplitude that drops below a traction threshold during an approach.

Optionally, the time-varying measurement signal is obtained by averaging the measurement signal over a predetermined number of revolutions of the rotor assembly, in particular for a stage of level flight.

The stage of flight may be evaluated in conventional manner, e.g. by analyzing the speed of the aircraft and/or its altitude.

The term "erroneous amplitude" refers to an amplitude that is equal to or greater than a threshold, e.g. established by testing, or else to an amplitude that is substantially different from the amplitudes observed for the other pitch rods of a rotor assembly.

In this procedure, a traction deformation gauge can serve to emit a measurement signal containing two indicators that are suitable for use in evaluating the presence of wear in a ball joint of a pitch rod. A first indicator is in the form of an erroneous amplitude for a time-varying traction signal and a second indicator is in the form of one or more frequency components of a signal that has been processed in the frequency domain and that is/are of amplitude less than a traction threshold for approach, e.g. as established by testing.

When at least one deformation gauge is a bending deformation gauge arranged to measure bending deformation, the method comprises the following steps:
  establishing a time-varying bending measurement signal by measuring deformation of the pitch rod with the bending deformation gauge; and
  establishing a processed measurement signal that has been processed at least by performing a Fourier transform on the time-varying bending measurement signal, and detecting a degree of wear that requires replacement of the ball-joint connection device when the processed measurement signal presents, at a predetermined frequency or in a predetermined range of frequencies, at least one frequency component that has an amplitude that becomes greater than a bending threshold.

Optionally, the time-varying measurement signal is obtained by averaging the measurement signal over a predetermined number of revolutions of the rotor assembly, in particular for a stage of level flight.

In this procedure, one, or indeed at least two, bending deformation gauges can enable a measurement signal to be emitted that contains an indicator that is usable and reliable for evaluating the presence of wear in a ball joint of a pitch rod. This indicator is in the form of one or more frequency components of a signal that has been processed in the frequency domain and that is/are of amplitude that is greater than a bending threshold, e.g. as established by testing.

BRIEF DESCRIPTION OF THE DRAWINGS

The invention and its advantages appear in greater detail in the context of the following description of embodiments given by way of illustration and with reference to the accompanying figures, in which:

FIG. 1 is a diagrammatic view of a rotor assembly provided with a detection system of the invention;

FIG. 2 is a view of a pitch rod fitted with a detection system of the invention;

FIG. 16 is a graph showing both a processed measurement signal obtained from a measurement signal emitted from a bending deformation gauge arranged on a pitch rod presenting a healthy ball joint and also a processed measurement signal obtained from a measurement signal emitted from a bending deformation gauge arranged on a pitch rod presenting a ball-joint connection device that is worn and that is to be removed.

DETAILED DESCRIPTION

Figure 3:
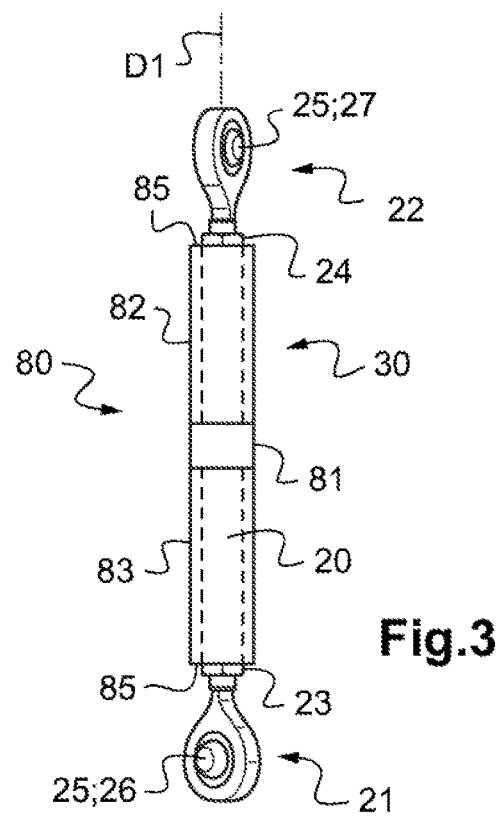
FIG. 3 is a view of a pitch rod fitted with a carrier of the invention.

FIG. 1 shows an embodiment of a detection system 30 of the invention seeking to detect wear of a ball-joint connection device, referred to more simply as a "ball joint".

By way of example, such a detection system 30 may be arranged on a rotor assembly 5, and in particular on a rotor assembly 5 of an aircraft 1, in order to detect wear of a ball-joint connection device 25 of a pitch rod 20.

Specifically, such a rotor assembly 5 may include a plurality of blades 10. Each blade 10 is carried by a rotor head not shown, possibly via a cuff 11 and/or via hinge and retaining devices. Certain blades may include cuffs that are integrated therein.

The rotor assembly 5 also includes multiple pitch rods, and in FIG. 1 it includes one pitch rod 20 for each blade 10 in order to connect each blade 10 to flight controls. Each pitch rod 20 extends longitudinally along its extension direction D1 from a first zone 21 to a second zone 22, the first zone 21 and/or the second zone 22 including a ball-joint connection device 25. For example, the first zone 21 is hinged to a rotary swashplate 8 of a set of swashplates 6, optionally via a first ball-joint connection device 26, and the second zone 22 is hinged to a pitch lever 9, optionally via a second ball-joint connection device 27. The non-rotary swashplate 7 is then controlled by flight controls, e.g. via servocontrols or via other pitch rods.

The rotor assembly 5 then has at least one detection system 30 of the invention for detecting wear of at least one ball-joint connection device 25 of at least one pitch rod 20.

FIGS. 1 to 7 show various non-restrictive embodiments of a detection system 30 of the invention, and FIGS. 8 to 16 comprise graphs showing a method of detecting wear of a ball-joint connection device 25 by means of such a detection system.

Independently of the embodiment, a detection system 30 includes at least one measurement assembly 31, and for example it may include one measurement assembly 31 for each blade. Such a measurement assembly 31 is provided with at least one measurement subassembly including at least one deformation gauge for placing on a pitch rod 20 that is to be monitored.

A measurement assembly 31 may include a traction-measurement subassembly 32. The traction-measurement subassembly 32 comprises at least one traction deformation gauge 33. The traction deformation gauge 33 may extend along an axial direction, optionally suitable for being parallel to the extension direction D1 of a pitch rod 20 so as to deform when the pitch rod 20 is stretched or compressed. For example, where appropriate, such an extension direction D1 passes through the centers both of a first ball-joint connection device 26 and also of a second ball-joint connection device 27 of the pitch rod 28.

A measurement assembly 31 may include at least one first bending measurement subassembly 34. For example, the first bending measurement subassembly 34 may include at least two first bending deformation gauges 35 and 36 arranged around a direction optionally suitable for coinciding with the extension direction D1.

A measurement assembly 31 may include at least one second bending measurement subassembly 37. For example, the second bending measurement subassembly 37 may include at least two second bending deformation gauges 38 and 39 that are arranged around the extension direction D1 and that are offset in azimuth relative to the first deformation gauges 35 and 36.

In the example shown, a measurement assembly 31 may thus comprise in particular one traction deformation gauge 33 together with two first bending deformation gauges 35 and 36, and two second bending deformation gauges 38 and 39.

In another aspect, the detection system 30 comprises at least one electrical conditioning circuit 40 connected to at least one deformation gauge 33, 35, 36, 38, 39, and for example comprises one electrical conditioning circuit 40 for each measurement subassembly 32, 34, 37. The electrical conditioning circuit(s) 40 may be carried by a pitch rod 20 or may be arranged within a concentrator 90 arranged on the rotor head.

Furthermore, a detection system 30 includes at least one electrical energy source 50, and for example may include an electrical energy source 15 for each measurement subassembly 32, 34, 37. The electrical energy source(s) 50 may be carried by a pitch rod 20 or may be arranged within a concentrator 90.

Under such circumstances, each electrical conditioning circuit 40 receives electrical energy in order to prepare a measurement signal that varies as a function of the deformation of a deformation gauge 33, 35, 36, 38, 39 and as a function of said wear. For example, an electrical conditioning circuit 40 may comprise a Wheatstone bridge circuit including each deformation gauge 33, 35, 36, 38, 39 of a measurement subassembly. Furthermore, the electrical conditioning circuit 40 may include a voltmeter or the equivalent that emits a time-varying measurement signal relating to a potential difference that varies over time as a function of the deformation of the deformation gauges, which deformation varies as a function of the wear of a ball-joint connection device 25. Also, and by way of example, an electrical conditioning circuit 40 may include a memory for storing the emitted measurement signal.

Furthermore, a detection system 30 may include monitoring calculation means 60 that are connected by a wired or wireless connection to at least one electrical conditioning circuit 40. For example, a detection system 30 may comprise monitoring calculation means 60 connected to a single electrical conditioning circuit 40 and optionally carried by a pitch rod 20, or it may comprise respective monitoring calculation means 60 connected to each of the electrical conditioning circuits 40 of a pitch rod 20 and optionally carried by that pitch rod, or indeed it may comprise monitoring calculation means 60 arranged in a concentrator 90 and connected to at least one electrical conditioning circuit 40. Optionally shared calculation means 60 may also be arranged away from the rotor assembly 5.

By way of example, each monitoring calculation means 60 may comprise at least one processor or the equivalent, at least one memory, at least one integrated circuit, at least one programmable system, and/or at least one logic circuit, these examples not limiting the scope to be given to the term "monitoring calculation means".

Each monitoring calculation means 60 is configured to process at least one measurement signal emitted by an electrical conditioning circuit 40 in order to determine the presence of wear to a degree that requires maintenance action on the pitch rod 20 if the measurement signal processed by the monitoring calculation means 60 presents a predetermined anomaly.

Optionally, a detection system 30 may include warning means 70 in wired or wireless connection with at least one monitoring calculation means 60. The monitoring calculation means 60 transmit a signal to the warning means 70 that generate, where appropriate, a warning when a processed measurement signal presents a predetermined anomaly.

Furthermore, the detection system 30 may include one or more antennas for providing wireless connections.

For example, at least one first antenna 75 is used for transmitting a signal away from the rotor assembly 5. Thus, a first antenna 75 may be connected to an electrical conditioning circuit 40 in order to transmit a measurement signal to monitoring calculation means 60 present away from the rotor assembly 50. In another example, at least one first antenna 75 may be connected to monitoring calculation means 60 in order to transmit a signal, e.g. to warning means 70. The monitoring calculation means 60 may communicate with other monitoring calculation means 60, likewise via antennas.

FIG. 2 shows an embodiment. In this embodiment, the measurement assembly 31 is carried directly by the pitch rod 20, e.g. being fastened thereto by attachment means. By way of example, each deformation gauge 33, 35, 36, 38, 39 is adhesively bonded on the pitch rod 20 between the first zone 21 and the second zone 22 of the pitch rod.

In this embodiment, each measurement subassembly 32, 34, 37 is connected by a wired connection to a respective electrical conditioning circuit 40. By way of example, the electrical conditioning circuit 40 is likewise adhesively bonded on the pitch rod 20. Alternatively, it may be arranged in a concentrator that is constrained to rotate with the rotor assembly 5.

In this embodiment, each electrical conditioning circuit 40 is connected to one or more sources of electrical energy, optionally adhesively bonded on the pitch rod 20 or else arranged in a concentrator 90 that is constrained to rotate with the rotor assembly 5.

FIG. 3 shows another embodiment.

In this embodiment, a detector system 30 includes at least one carrier 80, and by way of example one carrier 80 for each pitch rod. The carrier 80 is hollow in its center so as to surround a segment of the pitch rod 20. The carrier 80 may be threaded onto the pitch rod 20 or it may comprise elements for fastening together, e.g. such as two half-shells for screwing together.

The carrier 80 may be provided with a fastener device 85 to enable it to be fastened to the pitch rod 20 that is to be monitored. Such a fastener device 85 may include high and low abutments for switching between two nuts 23 and 24 of the pitch rod, nut-and-bolt systems, . . . .

Furthermore, the carrier 80 possesses a measurement segment 81 that is elastically deformable, optionally for amplifying deformation of the pitch rod. For example, the measurement segment 81 may comprise an elastomer ring. The measurement segment 81 carries a measurement assembly 31, with each deformation gauge of the measurement assembly 31 being adjacent to the measurement segment or else embedded in the measurement segment 81, for example.

Figure 4:
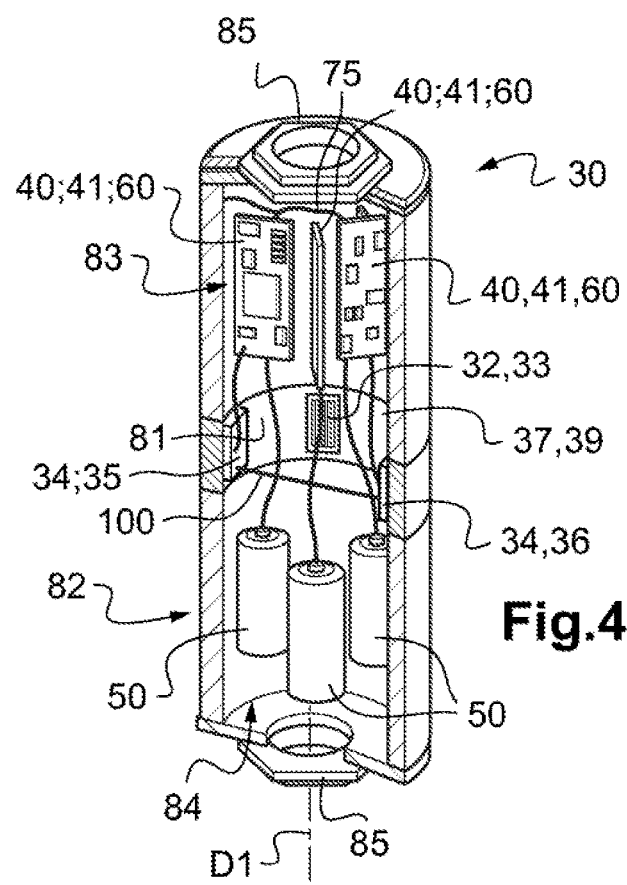
FIG. 4 is a diagram showing an example of a carrier of the invention.

With reference to FIG. 4, the measurement segment 81 need not be in contact with the pitch rod 20, at least when at rest, i.e. when there is no deformation of the pitch rod. By way of example, the measurement segment 81 surrounds a hollow space 84 through which the pitch rod 28 passes, and without coming into contact with the pitch rod 20. In the embodiment shown, the measurement segment 81 presents an inside diameter 100 that is greater than the outside diameter of a segment of the pitch rod 20 that is surrounded by the measurement segment 81.

Optionally, the measurement segment 81 is arranged longitudinally, i.e. along the longitudinal extension direction D1 of the pitch rod 20 between two rigid segments 82 and 83 that are for fastening to the pitch rod 20.

For example, the carrier 80 may have a segment fitted with at least one electrical energy source 50 in order to have its own energy supply, and/or at least one electrical conditioning circuit 40, and/or at least one monitoring calculation means 60, and/or at least one antenna 75. In an example, such a segment may be the measurement segment.

In the embodiment shown, a first segment 82 carries a respective electrical energy source 50 for each measurement subassembly. Furthermore, a second segment 83 carries at least one electrical conditioning circuit 40, and/or at least one monitoring calculation means 60, and/or at least one antenna 75, the measurement segment 81 being arranged between the first segment 82 and the second segment 83.

In this embodiment, the carrier 80 includes in particular one electronics card 41 for each measurement subassembly, i.e. three electronics cards 41 respectively for a single traction measurement subassembly 32, for the first bending measurement subassembly 34, and for the second bending measurement subassembly 37.

Under such circumstances, each electronics card 41 comprises an electrical conditioning circuit 40 connected by a wired connection to each deformation gauge of the associated measurement subassembly, and also to an energy source 50. Furthermore, the electronics card 41 may carry respective monitoring calculation means 60 connected to the electrical conditioning circuit 40 by a wired connection.

Also, the monitoring calculation means 60 may be connected to a common first antenna 75 and/or to respective antennas.

Figure 5:
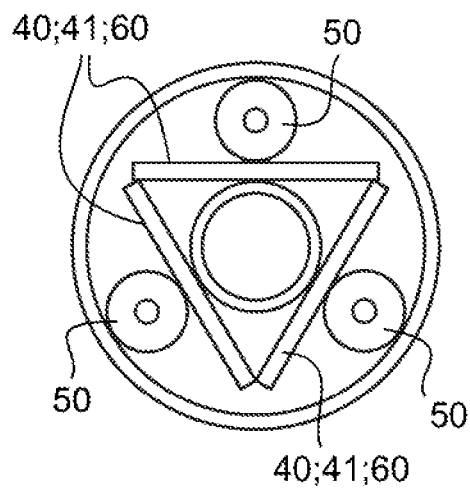
FIG. 5 is a diagrammatic plan view showing a carrier of the invention.
Figure 6:
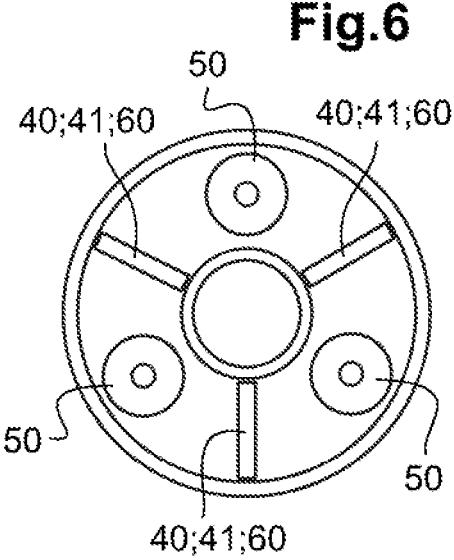
FIG. 6 is a diagrammatic plan view showing a carrier of the invention.

With reference to FIGS. 5 and 6, the electrical energy sources 50 and the electronics cards may be positioned so as to balance the carrier 80 in order to ensure that the carrier 80 does not interfere with the design of the pitch rod 20.

Figure 7:
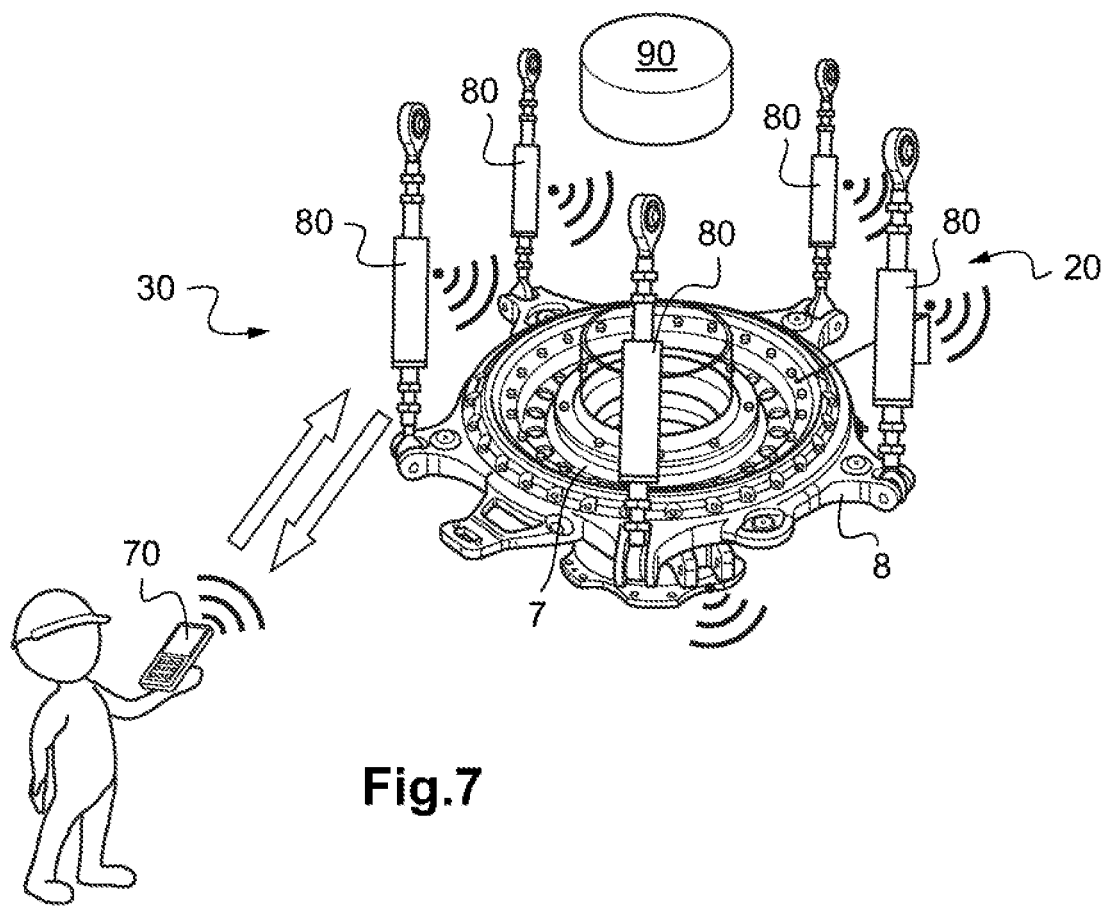
FIG. 7 is a fragmentary view of a rotary assembly provided with detection system carriers.

FIG. 7 shows a rotor assembly 5 including pitch rods 20 provided with carriers 80. Optionally, the carriers 80 need not include monitoring calculation means, the various electrical conditioning circuits 40 being connected by wired or wireless connections to at least one monitoring calculation means of a concentrator 90. Optionally, the carriers 80 need not include electrical energy sources, the various electrical conditioning circuits 40 being connected by wired connections to electrical energy sources 50 of a concentrator 90.

FIGS. 8 to 16 comprise various graphs for showing methods implemented by a detection system of the invention.

Figure 8:
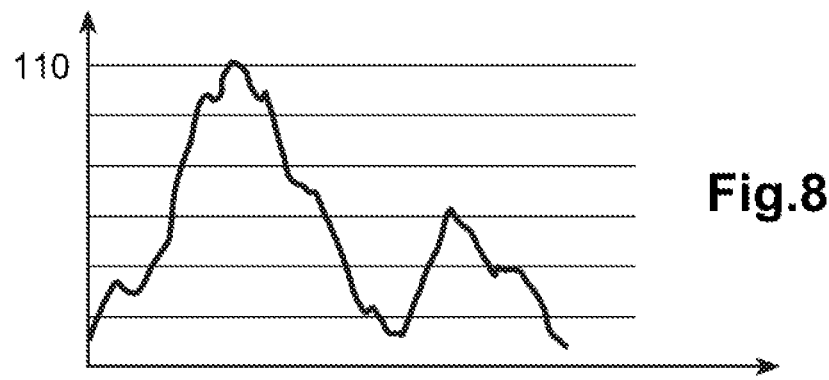
FIG. 8 is a graph showing a time-varying measurement signal emitted during a stage of level flight from a traction deformation gauge arranged on a pitch rod that presents a ball-joint connection device with no wear.
Figure 9:
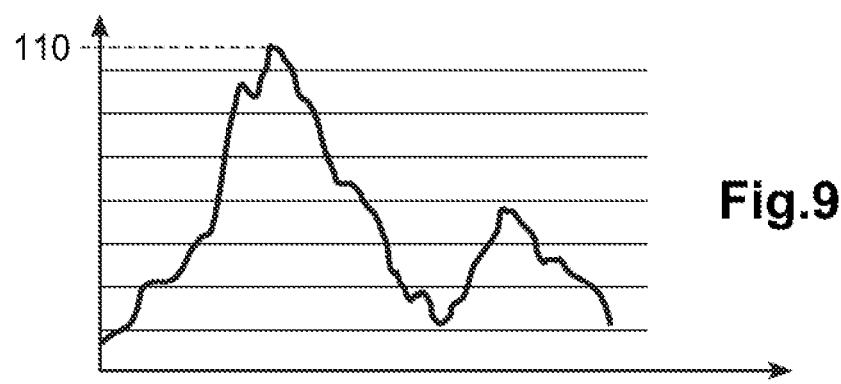
FIG. 9 is a graph showing a time-varying measurement signal emitted during a stage of level flight from a traction deformation gauge arranged on a pitch rod that presents a ball-joint connection device with medium wear.
Figure 10:
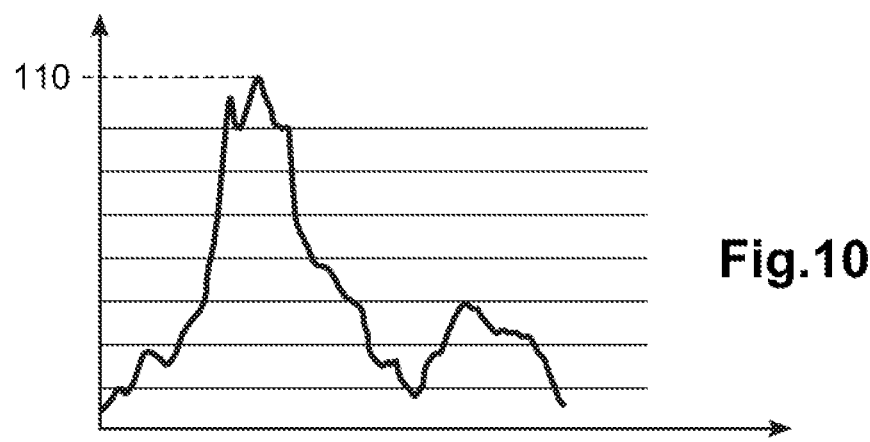
FIG. 10 is a graph showing a time-varying measurement signal emitted during a stage of level flight from a traction deformation gauge arranged on a pitch rod that presents a ball-joint connection device that is very worn and that is to be removed.

In particular, FIGS. 8 to 10 show wear of a ball-joint connection device 25 being detected by means of a time-varying measurement signal emitted by an electrical conditioning circuit 40 from a traction deformation gauge 33.

In this method, the electrical conditioning circuit normally emits an electrical signal in the form of a time-varying signal measuring traction that varies over time as a function of the deformation in traction and/or compression of the traction deformation gauge 33.

This time-varying measurement signal may optionally be processed by conventional sampling methods or by averaging over a predetermined number of revolutions of the rotor assembly 5.

Furthermore, the current stage of flight of the aircraft 1 is determined by conventional instruments.

The current stage of flight and the time-varying measurement signal may optionally be stored in a memory or they may be processed by monitoring calculation means 60.

FIG. 8 shows the time-varying measurement signal obtained for one revolution during a stage of level flight with a pitch rod that is healthy. FIG. 9 shows the time-varying measurement signal obtained over one revolution during a stage of level flight with a pitch rod that presents a ball-joint connection device with a degree of wear that is acceptable. FIG. 10 shows the time-varying measurement signal obtained over one revolution during a stage of level flight with a pitch rod that presents a ball-joint connection device with a degree of wear that requires maintenance action. FIGS. 8 to 10 thus comprise graphs, each plotting time along an abscissa axis and a potential difference up an ordinate axis, each curve showing a measurement signal that presents a potential difference that varies as a function of time.

An operator can perceive a defect visually by observing the maximum amplitude 110 of the time-varying measurement signal. The greater the amount of wear of a ball-joint connection device, the higher this maximum amplitude 110. It is thus possible to establish a threshold that is the image of a degree of wear requiring maintenance action.

Thus, while the aircraft 1 is in a stage of level flight, the method may comprise a step of detecting wear requires the ball-joint connection device 25 to be replaced once the time-varying traction measurement signal presents an erroneous amplitude, e.g. an amplitude greater than or equal to a threshold or that is different from the amplitudes of measurement signals coming from other pitch rods. This analysis may be performed visually by an operator or automatically by the monitoring calculation means.

Figure 11:
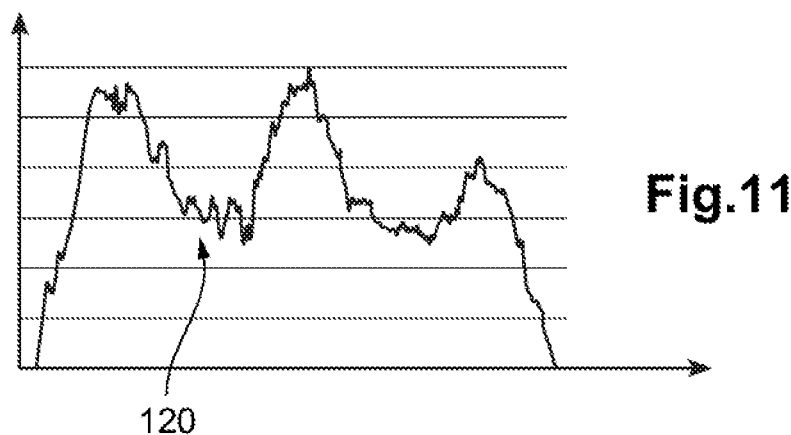
FIG. 11 is a graph showing a time-varying measurement signal emitted during an approach stage from a traction deformation gauge arranged on a pitch rod that presents a ball-joint connection device with no wear.
Figure 12:
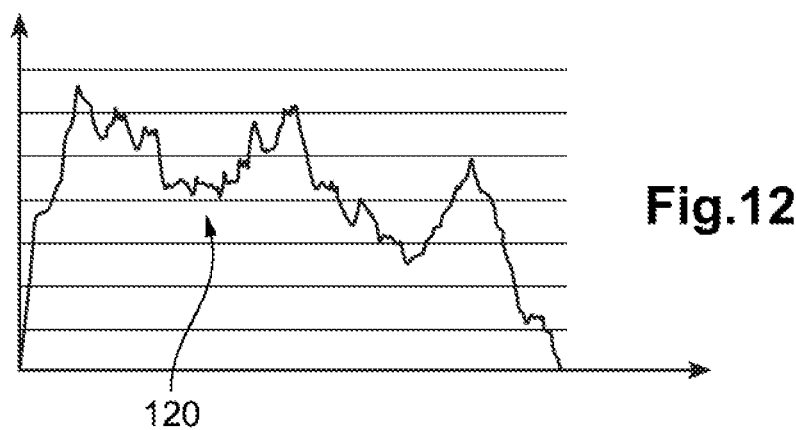
FIG. 12 is a graph showing a time-varying measurement signal emitted during an approach stage from a traction deformation gauge arranged on a pitch rod that presents a ball-joint connection device with medium wear.
Figure 13:
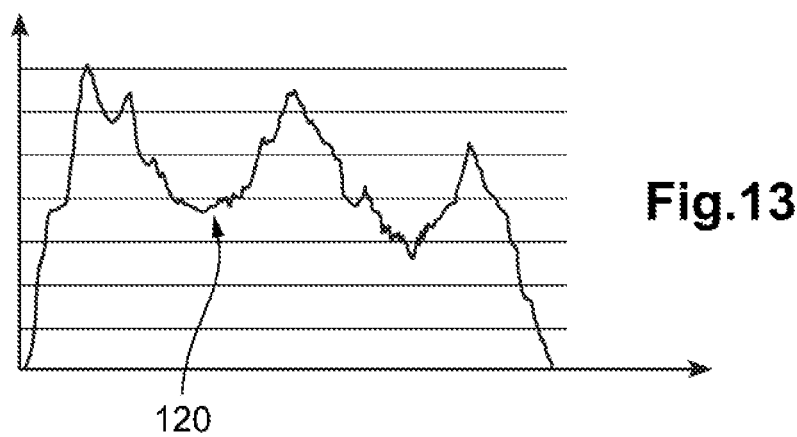
FIG. 13 is a graph showing a time-varying measurement signal emitted from a traction deformation gauge arranged on a pitch rod that presents a ball-joint connection device that is very worn and that is to be removed.

FIG. 11 shows the time-varying measurement signal obtained over one revolution during an approach stage from a traction deformation gauge on a pitch rod that is healthy. FIG. 12 shows the time-varying measurement signal obtained over one revolution during an approach stage from a traction deformation gauge on a pitch rod presenting a ball-joint connection device having a degree of wear that is acceptable. FIG. 13 shows the time-varying measurement signal obtained over one revolution during an approach stage from a traction deformation gauge on a pitch rod presenting a ball-joint connection device having a degree of wear that requires a maintenance action.

An operator can perceive a defect visually by observing the appearance of the time-varying measurement signal. The greater the amount of wear of a ball-joint connection device, the greater the extent to which the signal is "smoothed", as can be seen by looking at the segments 120 of the signals visible in FIGS. 11 to 13. Specifically, any clearance that is present in a ball-joint connection device has the effect of filtering out some fraction of the vibration in a pitch rod as induced by the resonant modes of vibration in the blade connected to the pitch rod and in lower dynamic assemblies.

In order to perform automatic processing, while the aircraft 1 is in an approach stage, the monitoring calculation means can process the time-varying traction measurement signal at least by performing a Fourier transform in order to obtain a processed measurement signal.

Figure 14:
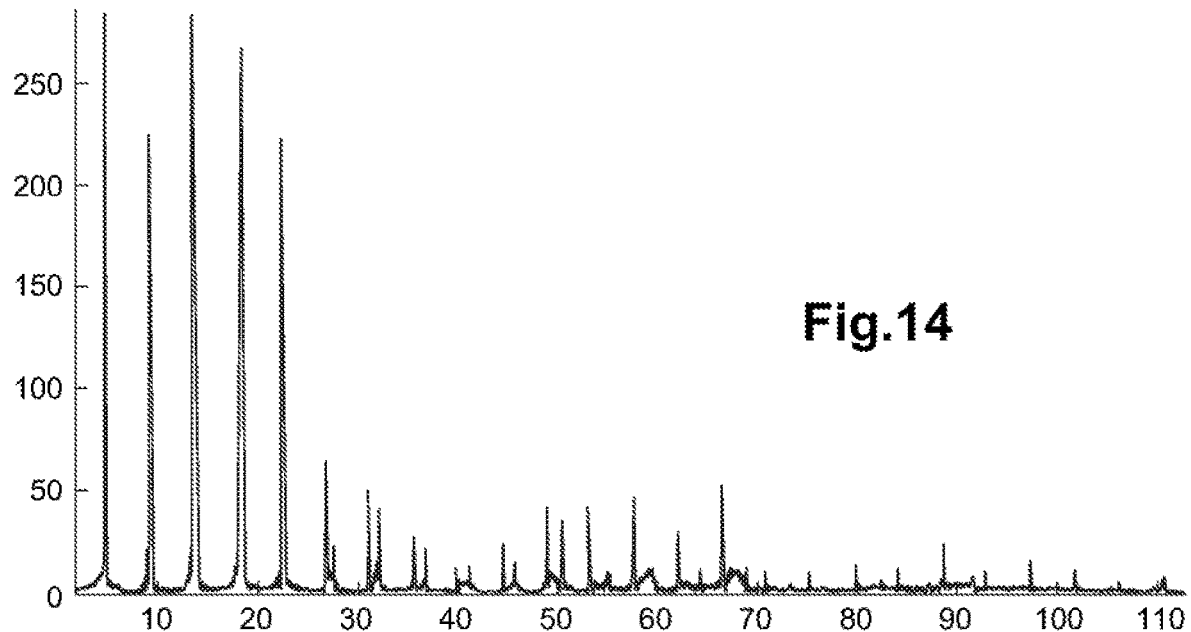
FIG. 14 is a graph showing a processed measurement signal obtained from a signal emitted during an approach stage from a traction deformation gauge arranged on a pitch rod that presents a ball-joint connection device with no wear.
Figure 15:
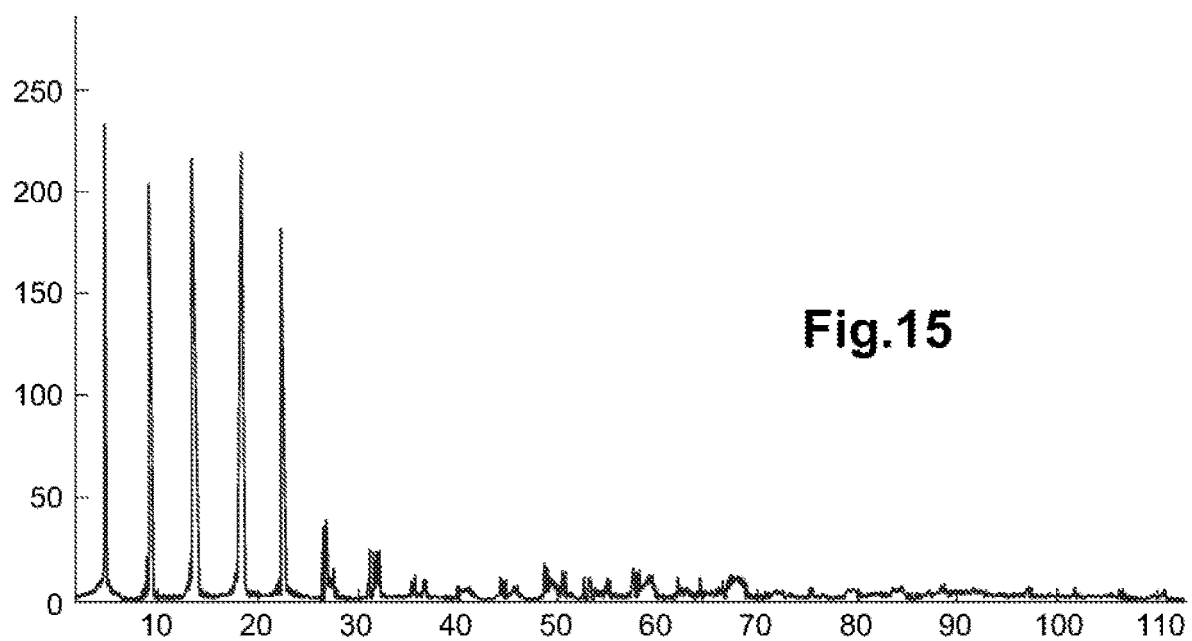
FIG. 15 is a graph showing a processed measurement signal obtained from a signal emitted during an approach stage from a traction deformation gauge arranged on a pitch rod that presents a ball-joint connection device that is worn and that is to be removed.

FIGS. 14 and 15 show such a processed measurement signal. FIG. 15 thus presents a graph having frequencies plotted along the abscissa axis and energy plotted up the ordinate axis. Frequency components of the processed measurement signal present attitudes the decrease in FIG. 15 when at least one ball-joint connection device presents wear that requires maintenance action.

Under such circumstances, the monitoring calculation means can detect wear that requires the ball-joint connection device 25 to be replaced when the processed signal presents, at a predetermined frequency or in a predetermined range of frequencies, one or more frequency components of amplitude dropping below a traction threshold during an approach or during level flight.

When at least one deformation gauge is a bending deformation gauge 35, 36, 38, 39, the electrical conditioning circuit emits in normal manner an electrical signal in the form of a time-varying bending measurement signal that varies as a function of the deformation of the deformation gauge.

This time-varying measurement signal may optionally be processed by conventional sampling methods or by averaging over a predetermined number of revolutions of the rotor assembly 5.

The time-varying measurement signal may optionally be stored in a memory.

Thereafter, monitoring calculation means can process the time-varying bending measurement signal at least by performing a Fourier transform in order to obtain a processed bending measurement signal.

FIG. 16 plots a first curve C1 that shows such a processed bending measurement signal emitted from a pitch rod that is healthy and a second curve C2 that shows such a processed bending measurement signal emitted from a pitch rod having a ball-joint connection device that is worn. In the presence of wear, numerous frequency components present increased amplitude.

Under such circumstances, the monitoring calculation means can detect wear that requires the ball-joint connection device 25 to be replaced when the processed signal presents, at a predetermined frequency or in a predetermined range of frequencies, one or more frequency components of amplitude rising above a bending threshold.

Naturally, the present invention may be subjected to numerous variations as to its implementation. Although several embodiments are described, it should readily be understood that it is not conceivable to identify exhaustively all possible embodiments. It is naturally possible to envisage replacing any of the means described by equivalent means without going beyond the ambit of the present invention.

The invention claimed is:

1. A detection system for detecting wear of a ball joint connection device of a pitch rod of a rotor assembly;
   wherein the detection system includes at least one measurement assembly, the at least one measurement assembly having at least one deformation gauge for placing on the pitch rod, the detection system comprising at least one electrical conditioning circuit connected to at least one of the at least one deformation gauge and to at least one electrical energy source, the electrical conditioning circuit being configured to generate a measurement signal that varies as a function of deformation of the at least one deformation gauge and as a function of the wear, the detection system including a carrier, the carrier being provided with a fastener device for fastening to the pitch rod that is to be monitored, the carrier including an elastically deformable measurement segment carrying the measurement assembly, the measurement segment surrounding a hollow space configured to have the pitch rod passing therethrough without being in contact with the pitch rod, the measurement segment being arranged longitudinally between two rigid segments for fastening to the pitch rod.

2. A detection system according to claim 1;
   wherein the detection system comprises monitoring calculation means in communication with the at least one electrical conditioning circuit, the monitoring calculation means being configured to process the measurement signal and to determine whether the wear is present to a degree that requires maintenance action on the pitch rod when the measurement signal as processed by the monitoring calculation means presents a predetermined anomaly.

3. A detection system according to claim 2;
   wherein the detection system includes warning means in communication with the monitoring calculation means, the monitoring calculation means being configured to control the warning means in order to signal the presence of wear when the measurement signal as processed presents the predetermined anomaly.

4. A detection system according to claim 1;
   wherein the detection system includes at least a first antenna for transmitting away from the rotor assembly either the measurement signal or else a signal emitted by a monitoring calculation means connected to the electrical conditioning circuit, the first antenna being connected to the electrical conditioning circuit or to the monitoring calculation means.

5. A detection system according to claim 1;
   wherein the two segments comprise a first segment including the at least one electrical energy source and a second segment including the at least one electrical conditioning circuit.

6. A detection system according to claim 1;
   wherein the measurement segment includes at least one energy source or of an electrical conditioning circuit.

7. A detection system according to claim 1;
   wherein the detection system comprises a plurality of measurement assemblies, each measurement assembly being connected to a concentrator by a wired or wireless connection, the concentrator comprising at least the electrical conditioning circuit.

8. A detection system according to claim 1;
   wherein the at least one measurement assembly include at least one traction deformation gauge extending along an axial direction suitable for being parallel to the extension direction (D1) of a pitch rod.

9. A detection system according to claim 1;
   wherein the at least one measurement assembly include at least two first bending deformation gauges arranged around a direction suitable for coinciding with the extension direction (D1) of a pitch rod.

10. A detection system according to claim 1;
    wherein the at least one measurement assembly include at least five deformation gauges comprising a traction deformation gauge together with at least two first bending deformation gauges arranged around an axis and at least two second bending deformation gauges arranged around the axis, the two first bending deformation gauges and the two second bending deformation gauges being offset in azimuth around the axis.

11. A rotor assembly provided with a plurality of blades and of pitch rods, each pitch rod extending longitudinally from a first zone to a second zone, at least one of the first and second zones including a ball joint connection device;
    wherein the rotor assembly includes at least one detection system according to claim 1, with each pitch rod carrying a measurement assembly.

12. An aircraft including a rotor assembly according to claim 11.

13. A detection system according to claim 1;
    wherein the elastically deformable measurement segment has an inside diameter that surrounds a segment of the pitch rod, the inside diameter of the elastically deformable measurement segment is greater than an outside diameter of the pitch rod.

14. A detection system according to claim 1;
    wherein the elastically deformable measurement segment comprises an elastomeric ring.

15. A detection system according to claim 14;
    wherein the elastomeric ring has an inside diameter that surrounds a segment of the pitch rod, the inside diameter of the elastomeric ring is greater than an outside diameter of the pitch rod.

16. A detection system according to claim 1;
    wherein the fastener device is fastened to the pitch rod that is to be monitored and the two rigid segments are fastened to the pitch rod.

17. A detection system according to claim 16;
    wherein the pitch rod is connected to a ball-joint.

18. A detection method for detecting wear of a ball-joint connection device of a pitch rod of a rotor assembly of the aircraft, the rotor assembly being provided with a plurality of blades and of pitch rods, each pitch rod extending longitudinally from a first zone to a second zone, at least one of the first and second zones comprising a ball-joint connection device, the rotor assembly including at least one detection system including at least one measurement assembly having at least one deformation gauge for placing on the pitch rod, the detection system including at least one electrical conditioning circuit connected to at least one of the at least one deformation gauge and to at least one electrical energy source, the electrical conditioning circuit being configured to generate a measurement signal that varies as a function of deformation of the at least one deformation gauge and as a function of the wear;

wherein at least one deformation gauge is a traction deformation gauge arranged to measure deformation along the extension direction of the pitch rod and the method comprises the following steps:

establishing a time-varying traction measurement signal by measuring deformation of the pitch rod with the traction deformation gauge;

evaluating a current stage of flight of the aircraft; and while the aircraft is flying in a level stage of flight, detecting wear to a degree that requires replacement of the ball-joint connection device when the time-varying traction measurement signal presents an erroneous amplitude, and/or while the aircraft is in an approach stage of flight, establishing a processed measurement signal at least by performing a Fourier transform on the time-varying traction measurement signal and detecting a degree of wear that requires replacement of the ball-joint connection device when the processed measurement signal presents, at a predetermined frequency or in a predetermined range of frequencies, at least one frequency component that has an amplitude that drops below a traction threshold during an approach.

19. A detection method for detecting wear of a ball-joint connection device of a pitch rod of a rotor assembly of the aircraft, the rotor assembly being provided with a plurality of blades and of pitch rods, each pitch rod extending longitudinally from a first zone to a second zone, at least one of the first and second zones comprising a ball-joint connection device, the rotor assembly including at least one detection system including at least one measurement assembly having at least one deformation gauge for placing on the pitch rod, the detection system including at least one electrical conditioning circuit connected to at least one of the at least one deformation gauge and to at least one electrical energy source, the electrical conditioning circuit being configured to generate a measurement signal that varies as a function of deformation of the deformation gauge(s) and as a function of the wear;

wherein at least one deformation gauge is a bending deformation gauge arranged to measure bending deformation of the pitch rod, and the method comprises the following steps:

establishing a time-varying bending measurement signal by measuring deformation of the pitch rod with the bending deformation gauge; and establishing a processed measurement signal at least by performing a Fourier transform on the time-varying bending measurement signal, and detecting a degree of wear that requires replacement of the ball-joint connection device when the processed measurement signal presents, at a predetermined frequency or in a predetermined range of frequencies, at least one frequency component that has an amplitude that becomes greater than a bending threshold.

* * * * *